Nov. 5, 1935.  J. C. CURTIS  2,019,659
ROCK DRILL MOUNTING
Filed Feb. 3, 1934
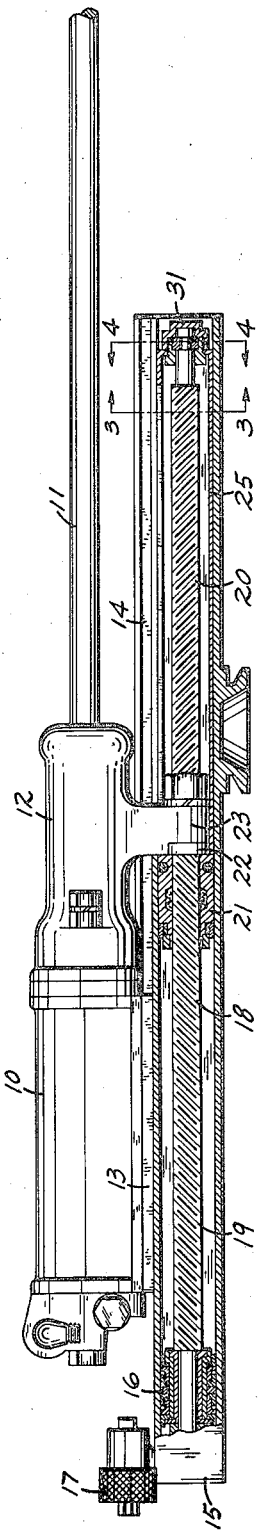
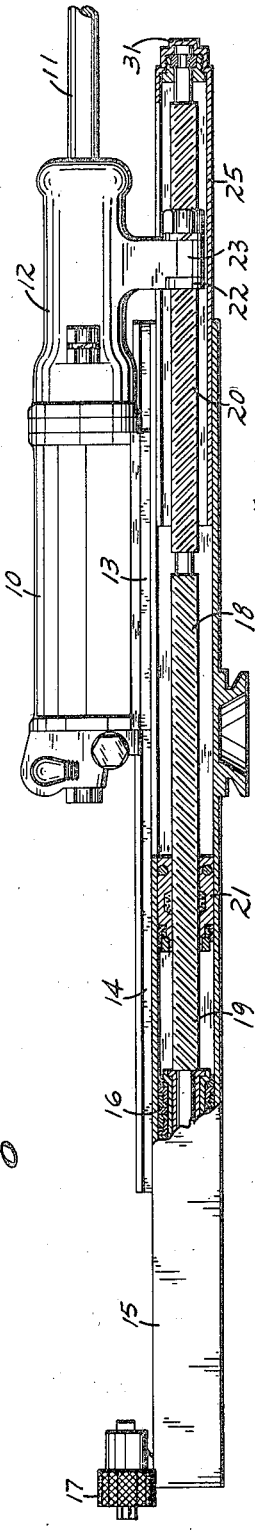
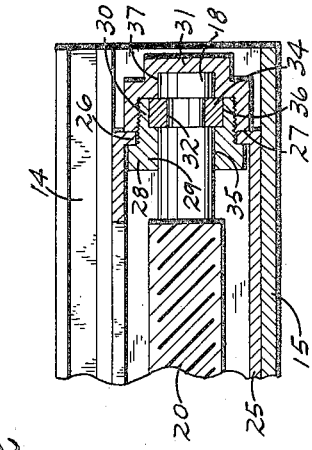
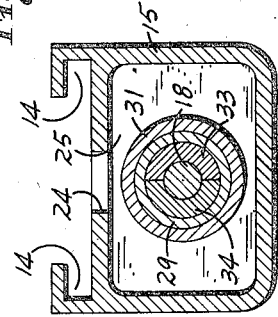
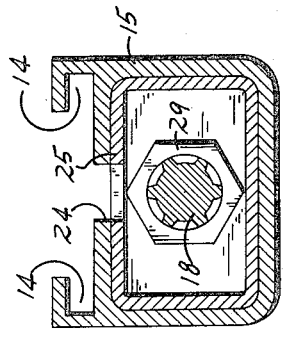
JOHN C. CURTIS
INVENTOR
BY *John V. Renfer*
ATTORNEY Patented Nov. 5, 1935

2,019,659

UNITED STATES PATENT OFFICE 2,019,659

ROCK DRILL MOUNTING

John C. Curtis, Garfield Heights, Ohio, assignor to The Cleveland Rock Drill Company, Cleveland, Ohio, a corporation of Ohio Application February 3, 1934, Serial No. 709,567

12 Claims. (Cl. 121—9)

This invention relates broadly to rock drills, but more particularly to a feeding mechanism for rock drills of the drifter type, wherein the reciprocation of the feed piston is transmitted to the drill by a feed screw.

One object of this invention is to provide adequate bearings for the ends of the feed screw, precluding thereby the vibrations transmitted to the latter to cause the whipping and the consequential crystallization and breakage thereof.

Another object of this invention is to provide a shell longitudinally movable with the feed screw for protecting the latter against accidental forces tending to cause the breakage thereof.

Other objects and advantages more or less ancillary to the foregoing reside in the specific construction and aggroupment of the elements peculiar to this structure, as will become apparent from a more complete examination of this specification.

In the drawing which illustrates a preferred embodiment of the invention:

Fig. 1 is a longitudinal view partly in section of the drilling mechanism illustrating the drilling motor at one extreme end of its travel.

Fig. 2 is a view similar to Fig. 1 illustrating the drilling motor toward the other extreme end of its travel.

Fig. 3 is an enlarged cross sectional view taken in a plane indicated by line 3—3 in Fig. 1.

Fig. 4 is an enlarged cross sectional view taken in a plane indicated by line 4—4 in Fig. 1.

Fig. 5 is an enlarged sectional view of the end bearing shown in Figs. 1 and 2.

Referring to the drawing, the rock drill shown for the purpose of illustration comprises a cylinder 10 having reciprocable therein a piston capable of delivering its blows to a cutting tool or drill steel 11, which has one end thereof rotatably mounted within a front housing 12. The cylinder 10 is provided with the usual guides 13 adapted to slide within the guideways 14 formed on the feed tube 15. Reciprocably mounted within the feed tube 15, there is the usual feed piston 16 which may be actuated by the pressure fluid admitted into the feed tube through passages controlled by the throttle valve 17. Connected to the piston 16 for reciprocation therewith, there is a screw 18 formed with a left hand threaded portion 19 and a right hand threaded portion 20, the former being capable of engagement with the stationary nut 21. Engageable with the screw portion 20, there is a nut 22 which is secured to a tongue 23 formed integral with the front housing 12. The lead of the threads of the screw 18 is of an angle calculated to cause the rotation of the screw when the latter is pushed or pulled through the stationary nut 21.

The feed tube 15 is formed with a rectangular cross section having the upper wall thereof provided with a longitudinally disposed slot 24, extending from the stationary nut 21 to the right end of the tube. Slidably mounted within the right end portion of the feed tube 15, there is a tube or shell 25 of an external cross sectional configuration corresponding to that of the interior of the feed tube 15. Toward the right, the shell 25 is terminated by a vertical wall 26 formed with a centrally located orifice 27. Located in abutting relation with the internal face of the end wall 26, there is the head 28 of a bushing 29. This head is provided with flats engageable with the upper and lower walls of the shell 25 for preventing the rotation of the bushing. The bushing 29 is formed with a threaded portion 30 passing through the orifice 27 and adapted to receive a dome nut 31 for securing the bushing 29 to the shell 25. The extreme right end portion of the screw 18 is reduced to a diameter substantially equal to the root diameter of the screw, and is formed adjacent its right end with an annular groove 32 adapted to receive two semi-circular members 33 and 34. The bushing 29 is formed with a bore 35 adapted to rotatably receive the reduced right end portion of the screw 18, and with a counterbore 36 adapted to receive the two semi-circular members 33 and 34. Similarly the nut 31 is formed with a closed end counterbore 37 adapted to rotatably receive the extreme right end portion of the screw 18.

When pressure fluid is admitted on the left side of the piston 16, the latter together with the feed screw 18 will be driven toward the right. The extreme right end portion of the screw being rotatably secured within the semi-circular members 33 and 34 will cause the longitudinal movement of the shell 25. Since the latter is slidably mounted within the feed tube 15 in a manner permitting a minimum relative lateral movement, it will be seen that the right end of the screw is constantly well supported and maintained against excessive lateral vibrations by its engagement with the bushing 29. It will be noticed that when the rock drill is positioned as illustrated in Fig. 1, that is, at one extreme end of its travel, the nut 22 secured within the tongue 23 and travelling on the feed screw portion 20, is in its farthest position with respect to the right end of the screw. In this instance, if a bearing was not provided for the end of the screw, the vibrations resulting from the operation of the rock drill and transmitted to the screw portion 20, would be greatly amplified at the end thereof, thus causing an undesirable whipping of the screw. In the present construction, it will be noticed that when the screw portion 20 is submitted to the greatest vibration, the bearing provided at the end thereof is well within the feed tube 15, assuring thereby a rigid construction preventing the lateral vibratory motion of the end of the screw. When the unsupported length of the screw portion 20 is reduced due to the travel of the nut 22 thereon, the amplification of the vibrations at the end of the screw will be reduced proportionally, thus permitting the efficiency of the end bearing to remain constant even though the latter is moved away from the end of the feed tube 15.

When the screw is pushed or pulled through the nut 21 by the action of the pressure fluid on the feed piston 16, the internal threads of the nut engaging with the external left hand threads of the screw will cause the rotation of the latter. Since the screw portion 20 is formed with right hand threads, the nut 22 engaging with the latter will move in the same direction as that of the piston 16. Assuming the lead angle of the threads of the portion 19 to be equal to that of the portion 20, it will be understood that the nut 22 together with the rock drill will be moved twice as fast as the piston 16, since the longitudinal movement of the nut 22 is the resultant of the longitudinal and rotary motion of the screw portion 20. The longitudinal movement of the bearing secured to the end of the screw 18, is caused solely by the longitudinal movement of the screw, thus it will be understood that if the rock drill with its appurtenant nut 22 is moved twice as fast as the piston 16, it is also moved at the same ratio with respect to the bearing secured at the end of the screw.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a drilling apparatus, the combination with a driling motor, of a feeding mechanism therefor comprising a housing having a fluid actuated feeding element reciprocable therein, a member having one end portion thereof associated with said feeding element, and one portion thereof intermediate its ends associated with said drilling motor for transmitting the reciprocatory movement of said feeding element to said drilling motor, the other end portion of said member being free to move into or out of said housing, and means secured to said last mentioned end portion for guiding the latter against lateral movement irrespective of its position with respect to said housing.

2. In a drilling apparatus, the combination with a drilling motor, of a feeding mechanism therefor comprising a housing having an elongated member longitudinally movable therein and associated with said drilling motor for imparting feeding motion thereto, one end portion of said member being movable into or out of said housing, and means secured to said one end portion for guiding the latter against lateral movement.

3. In a drilling apparatus, the combination with a drilling motor, of a feeding mechanism therefor comprising a housing having an elongated element longitudinally movable therein and associated with said drilling motor for imparting feeding motion thereto, and a member telescopically movable into or out of said housing secured to one end portion of said element for guiding the latter against lateral movement.

4. In a drilling apparatus, the combination with a drilling motor, of a feeding mechanism therefor comprising a housing having an elongated element longitudinally movable therein and associated with said drilling motor for imparting feeding motion thereto, one portion of said element being movable into or out of said housing, and a member partly surrounding said one portion and associated therewith for telescopical movement into or out of said housing.

5. In a drilling apparatus, the combination with a drilling motor, of a feeding mechanism therefor comprising a housing formed of a duality of portions one slidable within the other, a fluid actuated element reciprocable within said housing associated with said motor for imparting feeding motion thereto, said element being constantly drivenly connected to one of said portions for transmitting the reciprocation of the former to the latter, varying thereby the overall length of said housing.

6. In a drilling apparatus, the combination with a drilling motor, of a feeding mechanism therefor comprising a housing formed of a duality of tubular members one slidable within the other, a fluid actuated element reciprocable within said housing associated with said motor for imparting feeding motion thereto, one of said members constituting a support upon which said motor is free to slide, the other of said members being secured to one end portion of said feeding element for supporting and guiding the same.

7. In a drilling apparatus, the combination with a drilling motor, of a feeding mechanism therefor comprising a housing formed of a duality of tubular members one slidable within the other, a fluid actuated feeding element reciprocable within said housing, a connection between said feeding element and said motor for transmitting the reciprocatory motion of the former to the latter, a bearing within said slidable member associated with one end of said feeding element for guiding said one end against lateral movement, and means within said tubular members affording the free passage of said connection.

8. In a drilling apparatus, the combination with a drilling motor, of a feeding mechanism therefor comprising a housing formed of a duality of tubular members, one stationary, the other movable relating thereto, a fluid actuated element reciprocable within said housing associated with said drilling motor for imparting feeding motion thereto and connected to said movable tubular member for moving the latter therewith irrespective of the position of said feeding element within said housing, said feeding element being thereby guided by said movable tubular member.

9. In a drilling apparatus, the combination with a drilling motor, of a feeding mechanism therefor comprising a housing formed of a duality of tubular members one slidable within the other, a fluid actuated element reciprocable within one of said tubular members, an elongated member associated with said element for reciprocation therewith, means associated with said elongated member for imparting rotation thereto during its reciprocation, and a bearing within said slidable tubular member adapted to receive one end portion of said elongated member in a manner whereby the reciprocation of the latter is transmitted to said slidable tubular member.

10. In a drilling apparatus, the combination with a drilling motor, of a feeding mechanism therefor comprising a housing formed with two chambers, one being normally closed to the atmosphere, the other being normally open thereto, an element reciprocable within said closed chamber having a portion thereof extending into said open chamber, and means responsive to the reciprocation of the portion of said element within said open chamber for varying the length of the latter proportionally to the length of the former therein.

11. In a drilling apparatus, the combination with a drilling motor, of a feeding mechanism therefor comprising a housing formed with two chambers, an element reciprocable within one of said chambers having a portion thereof extending into the other of said chambers, the length of said one chamber being somewhat greater than the possible travel of said element therein, and means whereby the length of said other chamber is always substantially equal to the length of the portion of said element therein.

12. In a drilling apparatus, the combination with a drilling motor, of a feeding mechanism therefor comprising a housing formed with two chambers, an element having portions thereof reciprocable within said chambers, one of said chambers being somewhat longer than the possible travel of said element, and means for varying the length of the other of said chambers proportionally to the length of the portion of said element therein.

JOHN C. CURTIS.